(12) United States Patent
Wienand et al.

(10) Patent No.: US 6,898,969 B2
(45) Date of Patent: May 31, 2005

(54) FLOW SENSOR ELEMENT AND METHOD OF USING SAME

(75) Inventors: Karl-Heinz Wienand, Aschaffenburg (DE); Karlheinz Ullrich, Gross-Umstadt (DE); Matthias Muziol, Mainhausen (DE)

(73) Assignee: Heraeus Sensor Technology GmbH, Hanau (DE)

( * ) Notice: Subject to any disclaimer, the term of this patent is extended or adjusted under 35 U.S.C. 154(b) by 0 days.

(21) Appl. No.: 10/742,235

(22) Filed: Dec. 19, 2003

(65) Prior Publication Data

US 2004/0159152 A1 Aug. 19, 2004

(30) Foreign Application Priority Data

Dec. 20, 2002 (DE) .......................................... 102 60 896
Feb. 12, 2003 (DE) .......................................... 103 05 694

(51) Int. Cl.[7] ................................................. G01F 1/68
(52) U.S. Cl. .................................................. 73/204.26
(58) Field of Search ......................... 73/204.26, 204.22, 73/204.24

(56) References Cited

U.S. PATENT DOCUMENTS 5,396,795 A * 3/1995 Araki ...................... 73/204.26
5,744,713 A * 4/1998 Wienand et al. ......... 73/204.26

FOREIGN PATENT DOCUMENTS

| DE | 195 06 231 A1 | 8/1995 |
| DE | 199 41 420 A1 | 4/2000 |
| DE | 101 24 964 A1 | 12/2002 |
| DE | 102 25 602 | 1/2004 |
| EP | 1 065 476 A1 | 1/2001 |

* cited by examiner

Primary Examiner—Harshad Patel
(74) Attorney, Agent, or Firm—Akin Gump Strauss Hauer & Feld, LLP

(57) ABSTRACT

A flow sensor element is provided having at least one temperature-measuring element and at least one heating element each having at least one platinum thin film resistor, the at least one temperature-measuring element and the at least one heating element each being arranged on a carrier element which is formed from a ceramic foil laminate or a multi-part ceramic component. The carrier elements have electrical conductor paths and junction surfaces for electrically contacting the at least one temperature-measuring element and the at least one heating element. The at least one temperature-measuring element and the at least one heating element each have a metallic carrier foil with an electrically insulating coating, on which the platinum thin film resistors are arranged. The flow sensor element may be used for mass through-flow measurements of gaseous or liquid media in pipe ducts, for example in an exhaust gas pipe of an internal combustion engine.

31 Claims, 7 Drawing Sheets

FLOW SENSOR ELEMENT AND METHOD OF USING SAME

BACKGROUND OF THE INVENTION

The invention relates to a flow sensor element, which has at least one temperature-measuring element with at least one platinum thin film resistor and at least one heating element with at least one platinum thin film resistor. The at least one temperature-measuring element and the at least one heating element are arranged on a carrier element, formed from a ceramic foil laminate or a multi-part ceramic component. The carrier element has electric conductor paths and junction surfaces, for electrically contacting the at least one temperature-measuring element and also the at least one heating element. The further invention relates to the use of such a flow sensor element.

Such flow sensor elements are known from European published patent application EP 1 065 476 A1. There, a thermal air through-flow sensor is disclosed, in which a sensor element with a heating resistor and a resistance temperature-measuring element is arranged sunken in a recess of a ceramic laminate member and fastened with ceramic cement. Because of the adhesive bonding and the sunken arrangement of the sensor element with or in the ceramic laminate, the sensor element has a significant reaction inertia when the temperature of the measurement medium changes. The electrical contacts are covered in the flow region with an epoxy resin, so that use of the device at temperatures above 300° C. is not possible. In addition, the arrangement is expensive and hence cost-intensive.

Applicant's German patent application DE 102 25 602.0-33 (not yet published) discloses a temperature sensor with a total thickness of 10 to 100 $\mu$m and having a metallic foil substrate with an electrically insulating coating, on which a platinum thin film resistor is arranged as a temperature sensitive element. The temperature sensor is used in the region of a heat sink for a semiconductor element.

German published patent application DE 195 06 231 A1 discloses a hot film anemometer with a temperature measuring resistor and a heating resistor. The heating resistor is arranged like a bridge in a recess of a plastic support plate. The platinum temperature thin layer elements for the temperature-measuring resistor and for the heating resistor are arranged on a ceramic substrate, which is preferably made of aluminum oxide.

German published patent application DE 199 41 420 A1 discloses a sensor element for temperature measurement on a metallic substrate, which has an insulating layer as a membrane. The membrane spans over a recess in the metallic substrate. The platinum thin film is then arranged on the membrane in the region of the recess.

German published patent application DE 101 24 964 A1 discloses a sensor for measuring flow speed of gases or liquids with a support membrane constituted in the form of a flag. The support membrane is preferably made of a plastic and has an electrical conductive path of platinum and electrical supply leads. The use of such a sensor with a plastic support membrane is not possible at temperatures above 300° C.

BRIEF SUMMARY OF THE INVENTION

The invention has as an object providing a rapidly responding flow sensor element for the measurement of mass through-flows of hot gaseous or liquid media.

The object is attained for the flow sensor element in that the at least one temperature-measuring element and the at least one heating element respectively have a metallic carrier foil with an electrically insulating coating, on which the platinum thin film resistors are arranged.

The carrier foil is made appropriately thin, so that an exceedingly low thermal inertia of the system, and consequently a high response speed of the platinum thin film resistors, results. For forming a ceramic foil laminate, either ceramic green foils (i.e., unfired foils) are laminated and fired, or instead sintered ceramic foils are used, which are then preferably bonded with a glass solder. The materials used for constructing the flow sensor element can be those prominently used at temperatures in a range of about −40° C. to +800° C.

It is particularly preferred for the metallic carrier foil to have a thickness in a range of about 30 to 80 $\mu$m. As materials for the metallic carrier foil, nickel, nickel alloys, or iron alloys with fractions of chromium and aluminum, have been found to be satisfactory.

It is further preferred that the electrically insulating coating on the carrier foil have a thickness in a range of about 2 to 5 $\mu$m. In order to obtain a sufficient temperature resistance of the insulating coating, it has been found to be satisfactory to form the electrically insulating coating of ceramic. It is particularly preferred here for the insulating coating to be formed of a single layer of $Al_2O_3$ and/or SiO and/or $SiO_2$, or for the electrically insulating coating to be formed of at least two different single layers, wherein the individual layers are formed of $Al_2O_3$ and/or SiO and/or $SiO_2$.

It has been found satisfactory for the platinum thin film resistors to respectively have a thickness in a range of about 0.5 to 1.2 $\mu$m.

In order to protect the platinum thin film resistors from a corrosive attack by the measurement medium, it has been found satisfactory for these to be respectively covered with a passivating layer. The passivating layer preferably has a thickness in a range of about 1 to 5 $\mu$m. It has been found to be particularly satisfactory if the passivating layer is formed of a single layer of $Al_2O_3$ and/or SiO and/or $SiO_2$, or if the passivating layer is formed of at least two different single layers, wherein the single layers are formed of $Al_2O_3$ and/or SiO and/or $SiO_2$.

In order to obtain excellent response behavior of the flow sensor element, it has been found to be satisfactory for the carrier foil, the electrically insulating coating, the at least one platinum thin film resistor, and the passivating layer of the temperature-measuring element or the heating element to have a total thickness in a range of about 10 to 100 $\mu$m.

It is particularly preferred for the at least one temperature-measuring element to have a rectangular carrier foil with two long sides and two narrow sides, and for the carrier foil to be arranged in the region of one of the narrow sides between ceramic foils of the ceramic foil laminate, or between at least two portions of the ceramic component.

It is likewise preferred for the at least one heating element to have a rectangular carrier foil with two long and two narrow sides and for the carrier foil to be arranged in the region of one of the narrow sides between ceramic foils of the ceramic foil laminate or between at least two portions of the ceramic component.

The platinum thin film resistors are here preferably arranged on the end of the carrier foils remote from the ceramic foil laminate or ceramic components, in order to ensure the least possible thermal effect on the platinum thin film resistors by the thermally loaded ceramic foil laminate or the thermally loaded ceramic components.

In order to prevent mutual effects of the temperature-measuring element and heating element, it is advantageous for the at least one platinum thin film resistor of the heating element to be arranged further removed from the ceramic foil laminate or from the ceramic component than the at least one platinum thin film resistor of the temperature-measuring element. The platinum thin film resistors of the heating element are thereby not located in the same flow line of the measurement medium as the platinum thin film resistors of the temperature-measuring element.

Preferably, the carrier foils of the at least one heating element and of the at least one temperature-measuring element are arranged spaced apart from one another in series between like ceramic foils or portions of the ceramic component. Here, it has been found satisfactory for the ceramic foil laminate to be formed of two ceramic tubes, whose walls respectively have in cross section a half moon profile.

Particularly for the measurement of media with changing flow direction, it has been found satisfactory for a temperature-measuring element, two heating elements, and a temperature-measuring element to be arranged in series.

Furthermore, arrangements have been found satisfactory in which the ceramic foil laminate is formed of three ceramic foils. Here, it has been found particularly satisfactory for the carrier foils of the at least one heating element and of the at least one temperature-measuring element to be arranged spaced apart from one another by ceramic foils and arranged parallel to one another.

It is preferred to arrange a heating element between a first and a second ceramic foil, and a temperature-measuring element between the second and a third ceramic foil of the three ceramic foils, wherein the heating element and the temperature-measuring element are arranged adjacent to each other at the same level of the ceramic foil laminate.

In addition, it has been found satisfactory for the heating element to be arranged between a first and a second ceramic foil of the three ceramic foils, and for two temperature-measuring elements to be arranged between the second and a third ceramic foil of the three ceramic foils, wherein the heating element is arranged between the temperature-measuring elements.

Furthermore, arrangements have been found satisfactory in which the ceramic foil laminate is formed from four ceramic foils.

Here, it is preferred to arrange a first temperature-measuring element between a first and a second ceramic foil of the four ceramic foils, and a second temperature-measuring element between a third and a fourth ceramic foil of the four ceramic foils, and to arrange a heating element between the second and third ceramic foils, wherein the heating element and the temperature-measuring elements being arranged adjacent one another at the same level of the ceramic foil laminate.

It is furthermore preferred for a first temperature-measuring element to be arranged between a first and a second ceramic foil of the four ceramic foils, and a second temperature-measuring element to be arranged between a third and a fourth ceramic foil of the four ceramic foils, and for a heating element to be arranged between the second and third ceramic foils, wherein the temperature-measuring elements are arranged adjacent one another at the same level of the ceramic foil laminate, and the heating element is arranged offset relative to the temperature-measuring elements.

The use of a flow sensor element according to the invention for mass through-flow measurements of gaseous or liquid media through pipe ducts, wherein the carrier foils are arranged parallel to the flow direction of the medium, is ideal.

Here, the flow sensor element according to the invention is particularly suitable for measurements of gaseous media having a temperature in a range of about −40° C. to +800° C., such as that of the exhaust gas of an internal combustion engine.

The flow sensor element according to the invention is, however, also suitable for measurements of liquid media having a temperature in a range of about 0° C. to 150° C.

The arrangement of plural temperature-measuring elements and heating elements on the carrier element also permits, in an ideal manner, the detection of the flow direction or of flow direction changes of a medium. To this extent it is advantageous to use the flow sensor element according to the invention for measurements of media with periodic changes of flow direction.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIGS. 1–9a are to explain the flow sensor element according to the invention, solely by way of example. It is therefore to be expressly added here that the arrangement of the electric conductor paths and junction surfaces, as well as the number of platinum thin films per temperature-measuring element or heating element may also be chosen differently without departing from the scope of the invention.

In the drawings:

FIG. 6b is a side view the flow sensor element of FIG. 6a;

FIG. 9 is a cross-sectional view of flow sensor element with a multi-part ceramic component, a temperature-measuring element, and a heating element, taken along line 9–9' in FIG. 9a.

DETAILED DESCRIPTION OF THE INVENTION

Figure 1:
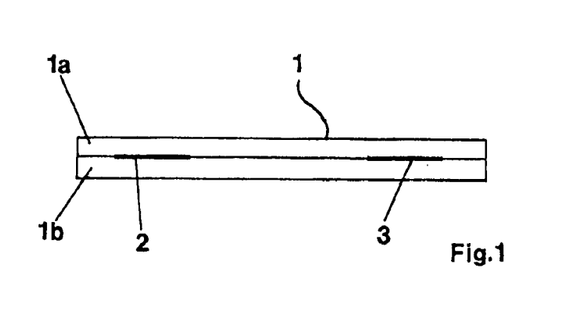
FIG. 1 is an end view of a flow sensor element with a two-layer ceramic foil laminate and a temperature-measuring element and a heating element.

FIG. 1 shows a flow sensor element with a ceramic foil laminate 1, which is formed from a first ceramic foil 1a of $Al_2O_3$ and a second ceramic foil 1b of $Al_2O_3$. A temperature-measuring element 2 and a heating element 3 are partially embedded and electrically contacted between the first ceramic foil 1a and the second ceramic foil 1b. It is not possible with this flow sensor element to detect the flow direction of a medium.

In principle, the measurement of the mass through-flow takes place according to the principle of a hot film anemometer. The heating element 3 is maintained by an electrical control circuit (bridge circuit and amplifier in a control circuit) either at a constant temperature (e.g., of 450° C.) or at a constant temperature difference (e.g., of 150° K.) to the temperature-measuring element 2. A change in the mass flow of the medium thus causes a change of the power uptake of the heating element 3, which can be electronically evaluated and is directly related to the mass flow.

Figure 1A:
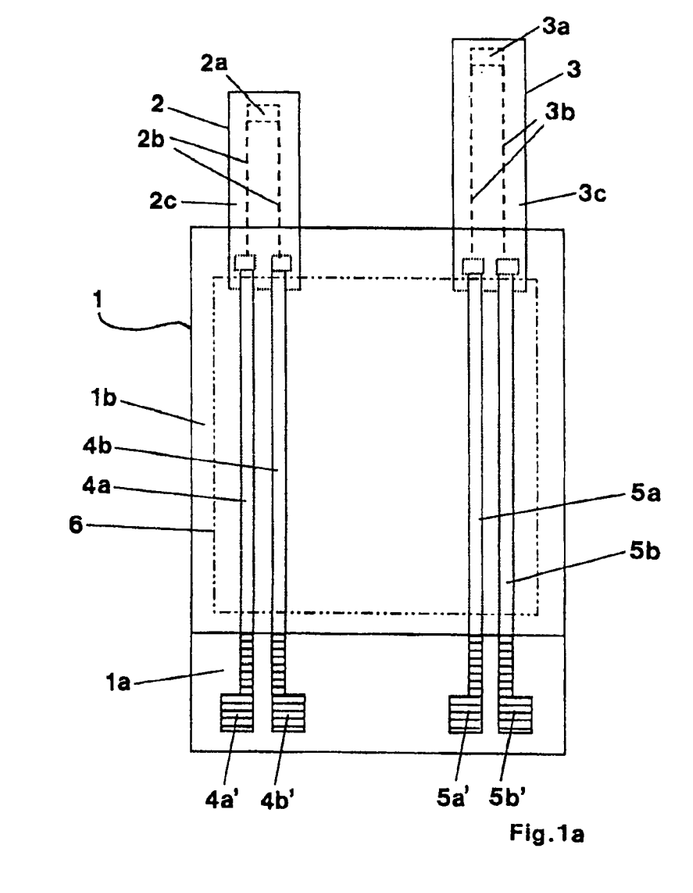
FIG. 1a is plan view showing the flow sensor element of FIG. 1.

FIG. 1a shows the flow sensor element in plan view. It can be seen here that the temperature-measuring element 2 and the heating element 3 are electrically contacted via electric conductor paths 4a, 4b, 5a, 5b with junction surfaces 4a', 4b', 5a', 5b'. The elect 4a, 4b, 5a, 5b are arranged on the first ceramic foil 1a and are partially covered by the second ceramic foil 1b. Their position is therefore shown partially dashed. The temperature-measuring element 2 has a carrier foil 2c with an electrically insulating coating (not shown here) comprising a single layer of $Al_2O_3$ or $SiO_2$. A platinum thin film element 2a for temperature measurement and its electrical junction leads 2b, including an electrically insulating coating, are arranged on the back side of the carrier foil 2c, and their position is therefore shown dashed. The heating element 3 has a carrier foil 3c with an electrically insulating coating (not shown here) consisting of a single layer of $Al_2O_3$ or $SiO_2$. A platinum thin film element 3a as a heater and its electrical junction leads 3b, including an electrically insulating coating, are arranged on the back side of the carrier film 3c, and their position is therefore shown dashed. The ceramic foils 1a, 1b are connected in the region 6 either by direct sintering together or with a glass solder. The junction surfaces 4a', 4b', 5a', 5b' are not covered by the second ceramic foil 1b, so that a connection with electrical junction cables (not shown here) can take place.

Figure 2:
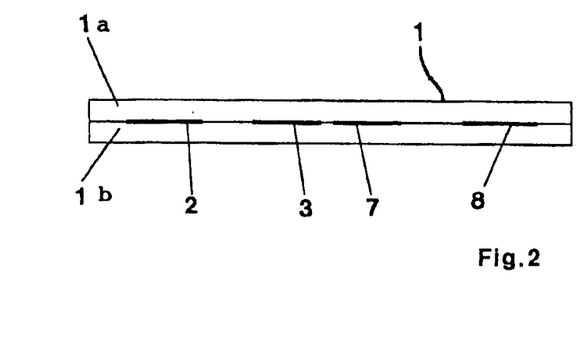
FIG. 2 is an end view of a flow sensor element with a two-layer ceramic foil laminate and two temperature-measuring elements.

FIG. 2 shows a flow sensor element with a ceramic foil laminate 1, formed from a first ceramic foil 1a of $Al_2O_3$ and a second ceramic foil 1b of $Al_2O_3$. Between the first ceramic foil 1a and the second ceramic foil 1b, two temperature-measuring elements 2, 8 and two heating elements 3, 7 are partially embedded and electrically contacted. In principle, the measurement again takes place on the principle of the hot film anemometer, as already described under FIG. 1. The number of the heating elements 3, 7 and temperature-measuring elements 2, 8 now permits, however, forming and evaluating a respective electrical control circuit for each heating element and each temperature-measuring element (2 and 3 or 7 and 8, respectively).

Figure 2A:
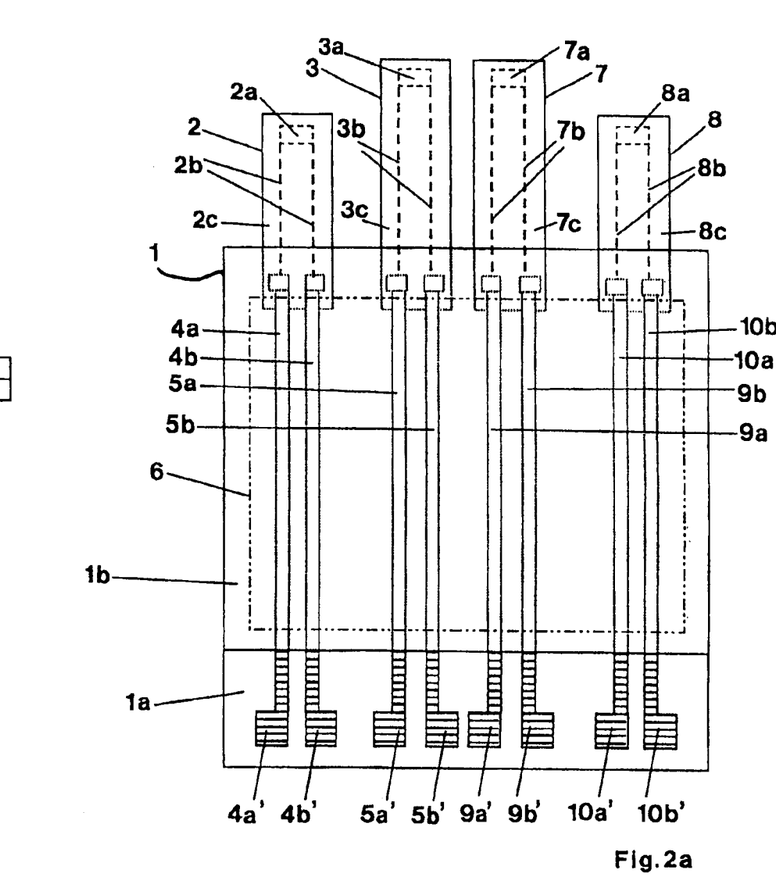
FIG. 2a is a plan view showing the flow sensor element of FIG. 2.

With this flow sensor element it is now possible to detect the flow direction of a medium, since a transfer of thermal energy takes place from the heating element, arranged first in the flow direction, to the following heating element. The temperature change, or heating, of the following heating element leads to a smaller power uptake by this heating element and can be evaluated as a signal for the flow direction of the medium, FIG. 2a shows the flow sensor element of FIG. 2 in plan view. It can be seen that the temperature-measuring elements 2, 8 and the heating elements 3, 7 are electrically contacted via electrical conductor paths 4a, 4b, 5a, 5b, 9a, 9b, 10a, 10b with junction surfaces 4a', 4b', 5a', 5b', 9b', 10a', 10b'. The electrical conductor paths 4a, 4b, 5a, 5b, 9a, 9b, 10a, 10b are arranged on the first ceramic foil 1a and are partially covered by the second ceramic foil 1b. Their position is therefore shown dashed. The temperature-measuring element 2 has a carrier foil 2c with an electrically insulating coating (not shown here) consisting of two single layers of $Al_2O_3$ and $SiO_2$. A platinum thin film element 2a for temperature measurement and its electrical junction leads 2b, including an electrically insulating coating, are arranged on the back side of the carrier foil 2c, and their position is therefore shown dashed. The heating element 3 has a carrier foil 3c with an electrically insulating coating (not shown here) consisting of two single layers of $Al_2O_3$ and $SiO_2$. A platinum thin film element 3a as heater and its electrical junction leads 3b, including an electrically insulating coating, are arranged on the back side of the carrier foil 3c, and their position is therefore shown dashed. The heating element 7 has a carrier foil 7c and an electrically insulating coating (not shown here) consisting of two single layers of $Al_2O_3$ and $SiO_2$. A platinum thin film element 7a as a heater and its electrical connection leads 7b, including an electrically insulating coating, are arranged on the back side of the carrier foil 7c, and their position is therefore shown dashed. The temperature-measuring element 8 has a carrier foil 8c with an electrically insulating coating (not shown here) consisting of two single layers of $Al_2O_3$ and $SiO_2$. A platinum thin film element 8a for temperature measurement and its electrical junction leads 8b, including an electrically insulating coating, are arranged on the back side of the carrier foil 8c, and their position is therefore shown dashed.

The ceramic foils 1a, 1b are connected in the region 6 either by direct sintering together or with a glass solder. The junction surfaces 4a', 4b', 5a', 5b', 9a', 9b', 10a', 10b' are not covered by the second ceramic foil 1b, so that a connection with electrical junction cables (not shown here) can take place.

Figure 3:
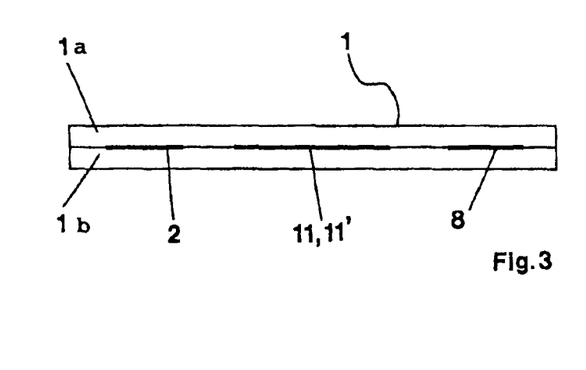
FIG. 3 is an end view of a flow sensor element with a two-layer ceramic foil laminate and two temperature-measuring elements and a double heating element.

FIG. 3 shows a flow sensor element with a ceramic foil laminate 1, which is formed of a first ceramic foil 1a of $Al_2O_3$ and a second ceramic foil 1b of $Al_2O_3$. Two temperature-measuring elements 2, 8 and a double heating element 11, 11' are partially embedded and electrically contacted between the first ceramic foil 1a and the second ceramic foil 1b'. By a double heating element is to be understood here that two heating elements, which can be electrically independently controlled, are embodied with a common coated carrier foil. With this flow sensor element it is also possible to detect the flow direction of a medium.

Figure 3A:
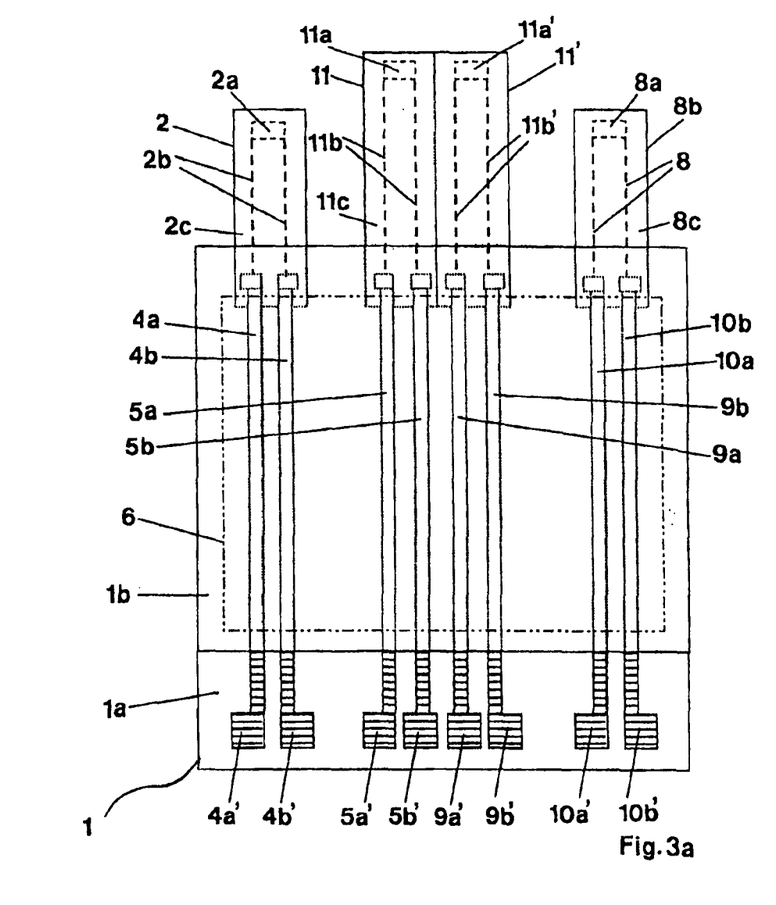
FIG. 3a is a plan view of the flow sensor element of FIG. 3.

FIG. 3a shows the flow sensor element of FIG. 3 in plan view. Here, it can be seen that the temperature-measuring elements 2, 8 and the double heating element 11, 11' are contacted via electric conductor paths 4a, 4b, 5a, 5b, 9a, 9b, 10a, 10b with junction surfaces 4a', 4b', 5a', 5b', 9a', 9b', 10a', 10b'. The electric conductor paths 4a, 4b, 5a, 5b, 9a, 9b, 10a, 10b are arranged on the first ceramic foil 1a and are partially covered with the second ceramic foil 1b. Their position is therefore shown partially dashed. The temperature-measuring element 2 has a carrier foil 2c with an electrically insulating coating (not shown here) consisting of a single layer of $Al_2O_3$. A platinum thin film element 2a for temperature measurement and its electrical junction leads 2b, including an electrically insulating coating, are arranged on the back side of the carrier foil 2c, and their position is therefore shown dashed. The double heating element 11, 11' has a carrier foil 11c with an electrically insulating coating (not shown here) consisting of two single layers of $Al_2O_3$ and $SiO_2$. Platinum thin film elements 11a and 11a' as heaters and their electrical junction leads 11b, 11b', including an electrically insulating coating, are arranged on the back side of the carrier foil 11c, and their position is therefore shown dashed. The temperature-measuring element 8 has a carrier foil 8c with an electrically insulating coating (not shown here) consisting of two single layers of $Al_2O_3$ and $SiO_2$. A platinum thin film element 8a for temperature measurement and its electrical junction leads 8b, including an electrically insulating coating, are arranged on the back side of the carrier foil 8c, and their position is therefore shown dashed.

The ceramic foils 1a, 1b in the region 6 are directly sintered together or connected with glass solder. The junction surfaces 4a', 4b', 5a', 5b', 9a', 9b', 10a', 10b' are not covered by the second ceramic foil 1b, so that a connection with electrical junction cables (not shown here) can take place.

Figure 4:
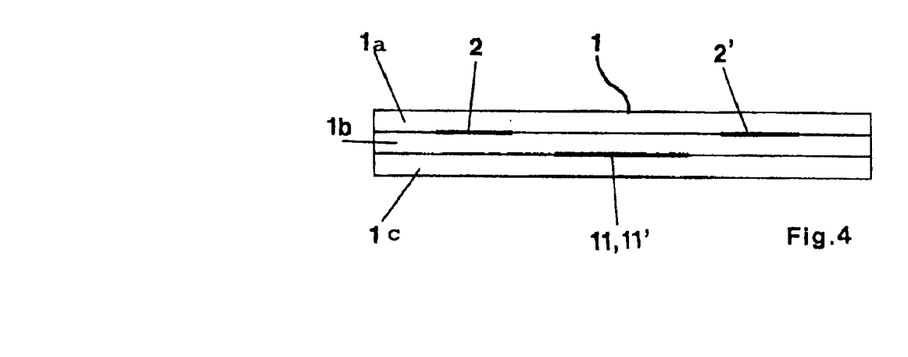
FIG. 4 is an end view of a flow sensor element with a three-layer ceramic foil laminate, two temperature-measuring elements, and a double heating element.

FIG. 4 shows a flow sensor element with a ceramic foil laminate 1 which consists of a first ceramic foil 1a, a second ceramic foil 1b, and a third ceramic foil 1c of $Al_2O_3$. Two temperature-measuring elements 2, 2' are partially embedded and electrically contacted between the first ceramic foil 1a and the second ceramic foil 1b. A double heating element 11, 11' is partially embedded and electrically contacted between the second ceramic foil 1b and the third ceramic foil 1c and the third ceramic foil 1c. The flow direction of a medium can be detected with this flow sensor element.

Figure 5:
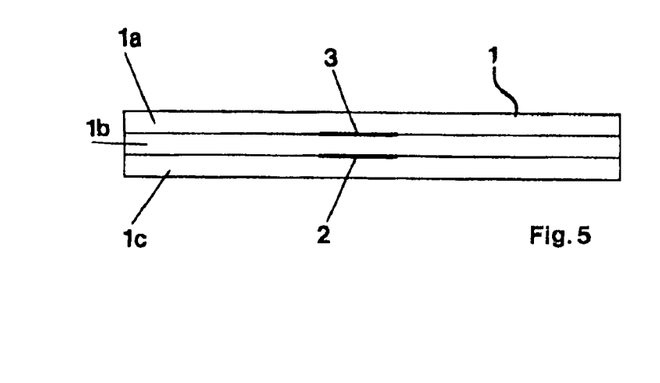
FIG. 5 is an end view of a flow sensor element with a three-layer ceramic foil laminate, a temperature-measuring element, and a heating element.
Figure 6:
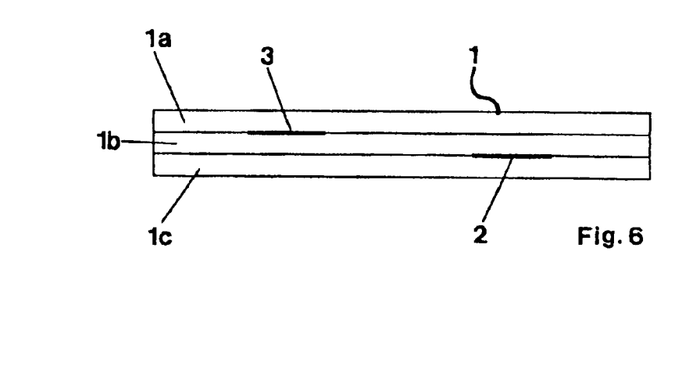
FIG. 6 is an end view of a flow sensor element with a three-layer ceramic foil laminate, a temperature-measuring element, and a heating element.

FIGS. 5 and 6 respectively show a flow sensor element with a ceramic foil laminate 1, which consists of a first ceramic foil 1a, a second ceramic foil 1b, and a third ceramic foil 1c of $Al_2O_3$. A temperature-measuring element 2 is partially embedded and electrically contacted between the third ceramic foil 1c and the second ceramic foil 1b. A heating element 3 is partially embedded and electrically contacted between the second ceramic foil 1b and the first ceramic foil 1a. It is not possible to detect the flow direction of a medium with these flow sensor elements.

Figure 6A:
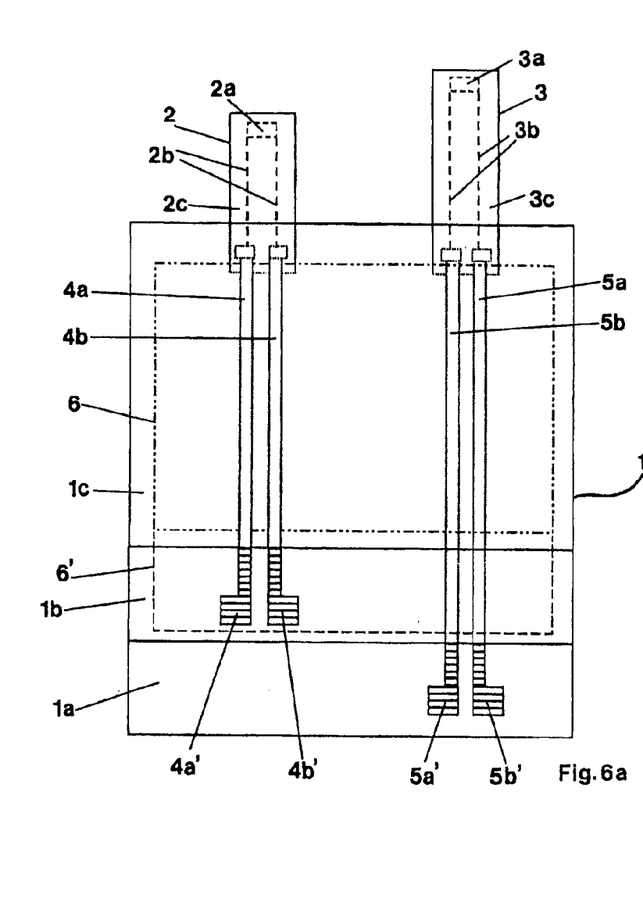
FIG. 6a is a plan view of the flow sensor element of FIG. 6.

FIG. 6a shows the flow sensor element of FIG. 6 in plan view. Here, it can be seen that the temperature-measuring element 2 and the heating element 3 are electrically contacted via electric conductor paths 4a, 4b, 5a, 5b to junction surfaces 4a', 4b', 5a', 5b'. The electric conductor paths 5a, 5b are arranged on the first ceramic foil 1a and partially covered by the second ceramic foil 1b. Their position is therefore partially shown dashed. The electric conductor paths 4a, 4b are arranged on the second ceramic foil 1b and are partially covered by the third ceramic foil 1c. Their position is therefore partially shown dashed. The temperature-measuring element 2 has a carrier foil 2c with an electrically conductive coating (not shown here) consisting of a single layer of $SiO_2$. A platinum thin film element 2a for temperature measurement and its electrical junction leads, including an electrically insulating coating, are arranged on the back side of the carrier foil 2c, and their position is shown dashed. The heating element 3 has a carrier foil 3c with an electrically insulating coating (not shown here) consisting of a single layer of $SiO_2$. A platinum thin film element 3a as a heater and its electrical junction leads 3b, including an electrically insulating coating, are arranged on the back side of the carrier foil 3c, and their position is therefore shown dashed.

The ceramic foils 1a, 1b in the region 6' are connected together either by direct sintering or with a glass solder. The junction surfaces 5a', 5b' are not covered by the second ceramic foil 1b, so that a connection can take place with electrical junction cables (not shown here). The ceramic foils 1b, 1c in the region 6 are connected together either by direct sintering or with a glass solder. The junction surfaces 4a', 4b' are not covered by the third ceramic foil 1c, so that a connection can take place with electrical junction cables (not shown here).

Figure 6B:
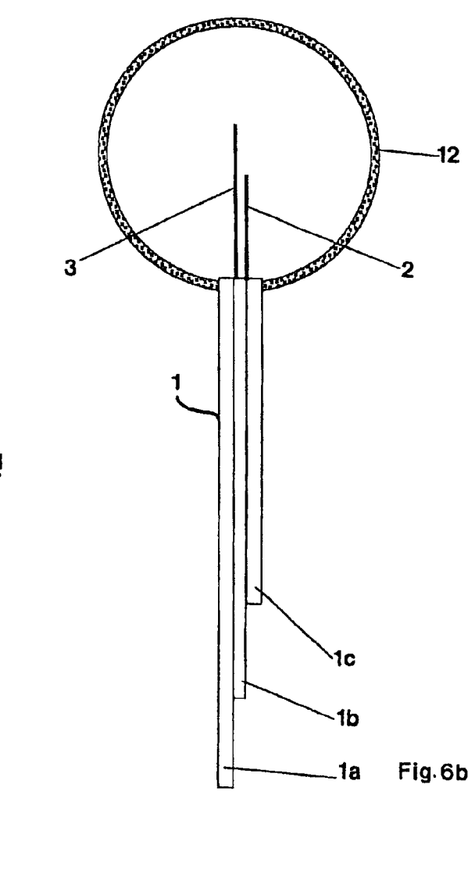

FIG. 6b shows the flow sensor element of FIG. 6a in side view, wherein this is built into the cross section of a pipe duct 12. The carrier foils 2c, 3c of the temperature-measuring element 2 and of the heating element 3 are here installed with their major surfaces parallel to the flow direction in the pipe duct.

Figure 7:
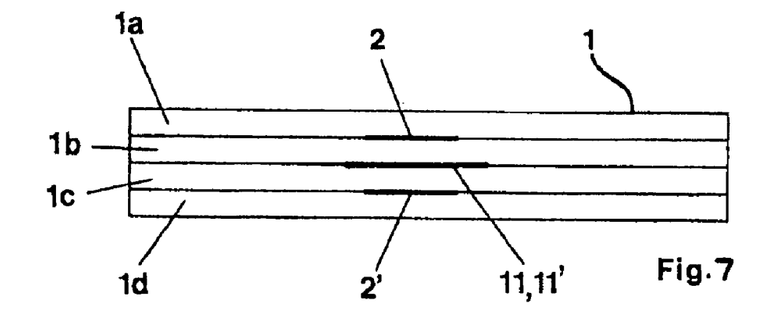
FIG. 7 is an end view of a flow sensor element with a four-layer ceramic foil laminate, two temperature-measuring elements, and a double heating element.
Figure 8:
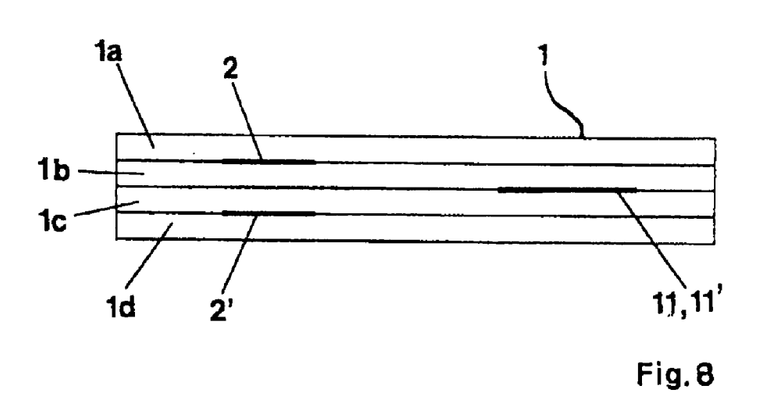
FIG. 8 is an end view of a flow sensor element with a four-layer ceramic foil laminate, two temperature-measuring elements, and a double heating element.

FIGS. 7 and 8 respectively show a flow sensor element with a ceramic foil laminate 1, which is formed from a first ceramic foil 1a, a second ceramic foil 1b, a third ceramic foil 1c, and a fourth ceramic foil 1d, all made of $Al_2O_3$. A temperature-measuring element 2 is partially embedded and electrically contacted between the first ceramic foil 1a and the second ceramic foil 1b. A double heating element 11, 11' is partially embedded and electrically contacted between the second ceramic foil 1b and the third ceramic foil 1c. A further temperature-measuring element 2' is partially embedded and electrically contacted between the third ceramic foil 1c and the fourth ceramic foil 1d. It is not possible to detect the flow direction of a medium with this flow sensor element.

Figure 9:
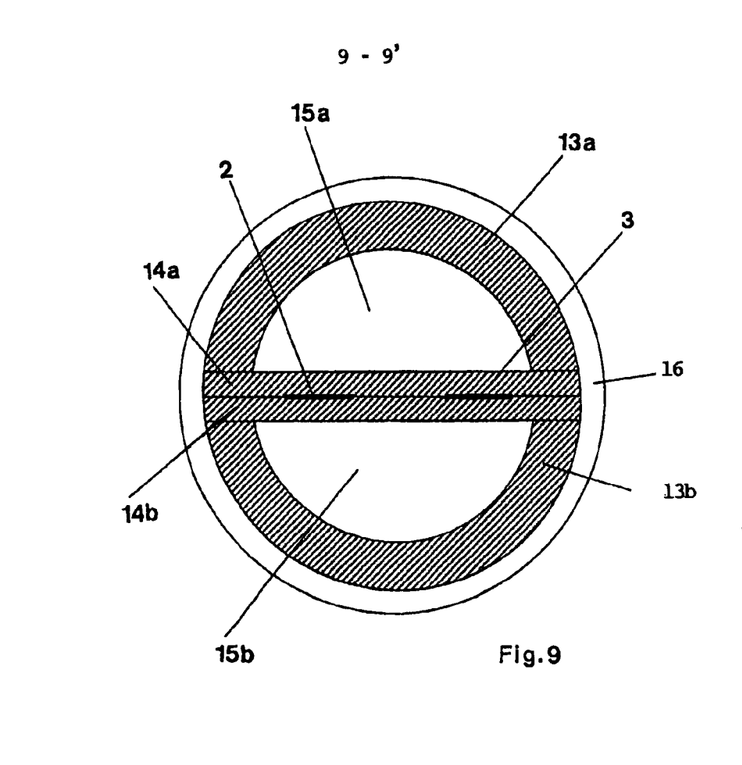

FIG. 9 shows a flow sensor element in cross section 9–9' (see FIG. 9a) with a multi-part ceramic component 13a, 13b, 14a, 14b of $Al_2O_3$, which has a temperature element 2 and a heating element 3. The ceramic component 13a, 13b, 14a, 14b has two cavities 15a, 15b which are closed gas-tight in the respective regions of the temperature-measuring element 2 and the heating element 3. A connecting flange 16 is present for building into a pipe duct. It is also not possible to detect the flow direction of a medium with this flow sensor element.

Figure 9A:
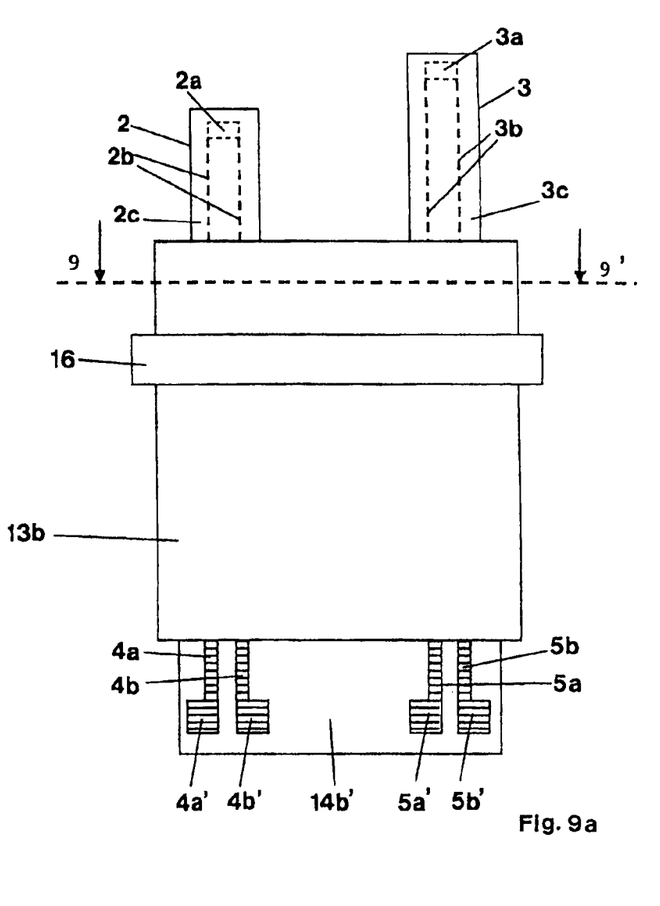
FIG. 9a is plan view of the flow sensor element of FIG. 9.

FIG. 9a shows the flow sensor element of FIG. 9 in plan view. Here, the temperature-measuring element 2 and the heating element 3 are electrically contacted via electric conductor paths 4a, 4b, 5a, 5b (only partially visible here) with junction surfaces 4a', 4b', 5a', 5b'. The electric conductor paths 4a, 4b, 5a, 5b are arranged on a ceramic plate 14a and partially covered (not visible in this view) with a second ceramic plate 14b. The temperature-measuring element 2 has a carrier foil 2c with an electrically insulating coating (not shown here) consisting of a single layer of $Al_2O_3$ or $SiO_2$. A platinum thin film element 2a for temperature measurement and its electrical junction leads 2b, including an electrically insulating coating, are arranged on the back side of the carrier foil 2c and their position is therefore shown dashed. The heating element 3 has a carrier foil 3c with an electrically insulating coating (not shown here) consisting of a single layer of $Al_2O_3$ or $SiO_2$. A platinum thin film element 3a as a heater and its electrical junction leads 3b, including an electrically insulating coating, are arranged on the back side of the carrier foil 3c, and their position is therefore shown dashed.

The ceramic plates 14a, 14b are connected together either by direct sintering or with a glass solder, and are connected with tube shells 13a, 13b to the ceramic component. However, it is possible instead to use two half tubes (13a plus 14a, 13b plus 14b), in which the ceramic plate 14b and the tube shell 13b and the ceramic plate 14a and the tube shell 13a, respectively, are combined into an integral component. The junction surfaces 4a', 4b', 5a', 5b' are not covered by the second ceramic plate 14b, so that a connection to electrical junction leads (not shown here) can take place.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A flow sensor element comprising: at least one temperature-measuring element and at least one heating element, each element having at least one platinum thin film resistor, the at least one temperature-measuring element and the at least one heating element being arranged on a carrier element comprising a ceramic foil laminate or a multi-part ceramic component, the carrier element having electric conductor paths and junction surfaces for electrically contacting the at least one temperature-measuring element and the at least one heating element, wherein the at least one temperature-measuring element (2, 2'; 8) and the at least one heating element (3, 7, 11, 11') each have a metallic carrier foil (2c, 3c, 7c, 8c, 11c) having an electrically insulating coating, on which the platinum thin film resistor (2a, 3a, 7a, 8a, 11a, 11a') is arranged.

2. The flow sensor element according to claim 1, wherein the metallic carrier foil (2c, 3c, 7c, 8c, 11c) has a thickness in a range of about 30 to 80 $\mu$m.

3. The flow sensor element according to claim 1, wherein the metallic carrier foil (2c, 3c, 7c, 8c, 11c) comprises at least one metal selected from the group consisting of nickel, nickel alloys, and iron alloys with fractions of chromium and aluminum.

4. The flow sensor element according to claim 1, wherein the electrically insulating coating has a thickness in a range of about 2 to 5 $\mu$m.

5. The flow sensor element according to claim 1, wherein the electrically insulating coating comprises ceramic.

6. The flow sensor element according to claim 5, wherein the electrically insulating coating is formed of a single layer or at least two different single layers, wherein each layer comprises at least one ceramic selected from the group consisting of $Al_2O_3$, SiO and $SiO_2$.

7. The flow sensor element according to claim 1, wherein the platinum thin film resistor (2a, 3a, 7a, 8a, 11a, 11a') has a thickness in a range of about 0.5 to 1.2 $\mu$m.

8. The flow sensor element according to claim 1, wherein the platinum thin film resistor (2a, 3a, 7a, 8a, 11a, 11a') is covered with a passivating film.

9. The flow sensor element according to claim 8, wherein the passivating layer has a thickness in a range of about 1 to 5 $\mu$m.

10. The flow sensor element according to claim 9, wherein the passivating layer is formed of a single layer or at least two different single layers, wherein each layer comprises at least one ceramic selected from the group consisting of $Al_2O_3$, SiO and $SiO_2$.

11. The flow sensor element according to claim 1, wherein the carrier foil (2c, 3c, 7c, 8c, 11c), the electrically insulating coating, the at least one platinum thin film resistor (2a, 3a, 7a, 8a, 11a, 11a'), and the passivating layer of the temperature-measuring element (2, 2', 8) or of the heating element (3, 7, 11, 11') have a total thickness in a range of about 10 to 100 $\mu$m.

12. The flow sensor element according to claim 1, wherein the at least one temperature-measuring element (2, 2', 8) comprises a rectangular carrier foil (2c, 8c) having two long sides and two narrow sides, and the carrier foil (2c, 8c) is arranged in a region of one of the narrow sides between ceramic foils (1a, 1b, 1c, 1d) of the ceramic foil laminate (1) or between at least two parts (14a, 14b) of the multi-part ceramic component (13a, 13b, 14a, 14b).

13. The flow sensor element according to claim 1, wherein the at least one heating element (3, 7, 11, 11') comprises a rectangular carrier foil (3c, 7c, 11c) having two long and two narrow sides, and the carrier foil (3c, 7c, 11c) is arranged in a region of one of the narrow sides between ceramic foils (1a, 1b, 1c, 1d) of the ceramic foil laminate (1) or between at least two parts (14a, 14b) of the multi-part ceramic component (13a, 13b, 14a, 14b).

14. The flow sensor element according to claim 1, wherein the at least one platinum thin film resistor (3a, 7a, 11a, 11a') of the heating element (3, 7, 11, 11') is arranged spaced further from the ceramic foil laminate (1) or from the multi-part ceramic component (13a, 13c, 14a, 14b) than the at least one platinum thin film resistor (2a, 8a) of the temperature-measuring element (2, 2', 8).

15. The flow sensor element according to claim 14, wherein the ceramic foil laminate (1) comprises three ceramic foils (1a, 1b, 1c).

16. The flow sensor element according to claim 15, wherein the carrier foils (2c, 3c, 7c, 8c, 11c) of the at least one heating element (3) and of the at least one temperature-measuring element (2, 2') are arranged parallel to one another and spaced apart from one another by ceramic foils (1b, 1c).

17. The flow sensor element according to claim 16, wherein one heating element (3) is arranged between a first ceramic foil (1a) and a second ceramic foil (1b), and one temperature-measuring element (2) is arranged between the second ceramic foil (1b) and a third ceramic foil (1c) of the three ceramic foils (1a, 1b, 1c), the heating element (3) and the temperature-measuring element (2) being arranged adjacent to one another at the same level of the ceramic foil laminate (1).

18. The flow sensor element according to claim 16, wherein one heating element is arranged between a first ceramic foil (1a) and a second ceramic foil (1b), and two temperature-measuring elements (2, 2') are arranged between the second ceramic foil (1b) and a third ceramic foil (1c) of the three ceramic foils (1a, 1b, 1c), the heating element being arranged laterally between the temperature-measuring elements (2, 2').

19. The flow sensor element according to claim 14, wherein the ceramic foil laminate (1) comprises four ceramic foils (1a, 1b, 1c, 1d).

20. The flow sensor element according to claim 19, wherein a first temperature-measuring element (2) is arranged between a first ceramic foil (1a) and a second ceramic foil (1b), a second temperature-measuring element (2') is arranged between a third ceramic foil (1c) and a fourth ceramic foil (1d) of the four ceramic foils (1a, 1b, 1c, 1d), and a heating element is arranged between the second ceramic foil (1b) and the third ceramic foil (1c), the heating element and the two temperature-measuring element (2, 2') are arranged adjacent to one another at the same level of the ceramic foil laminate (1).

21. The flow sensor element according to claim 19, wherein a first temperature-measuring element (2) is arranged between a first ceramic foil (1a) and a second ceramic foil (1b), a second temperature-measuring element (2') is arranged between a third ceramic foil (1c) and a fourth ceramic foil (1d) of the four ceramic foils (1a, 1b, 1c, 1d), and a heating element is arranged between the second ceramic foil (1b) and the third ceramic foil (1c), the temperature-measuring elements (2, 2') being arranged adjacent to one another at the same level of the ceramic foil laminate (1), and the heating element (3) being arranged laterally offset from the temperature-measuring elements (2, 2').

22. The flow sensor element according to claim 1, wherein the carrier foils (2c, 3c, 7c, 8c, 11c) of the at least one heating element (3, 7, 11, 11') and of the at least one temperature-measuring element (2, 2', 8') are arranged spaced apart from one another in series between like ceramic foils or parts of the multi-part ceramic component.

23. The flow sensor element according to claim 22, wherein the ceramic foil laminate (1) comprises two ceramic foils (1a, 1b).

24. The flow sensor element according to claim 22, wherein the ceramic component (13a, 13b, 14a, 14b) comprises two ceramic pipes (13a, 14a; 13b, 14b), each of whose walls has a half moon profile in cross section.

25. The flow sensor element according to claim 24, wherein one temperature-measuring element (2), two heating elements (3, 7'; 11, 11'), and one temperature-measuring element (8) are arranged in series.

26. The flow sensor element according to claim 22, wherein one temperature-measuring element (2), two heating elements (3, 7'; 11, 11'), and one temperature-measuring element (8) are arranged in series.

27. The flow sensor element according to claim 1, arranged in a through pipe duct (12) for mass through-flow measurement of a gaseous or liquid medium in the pipe duct, wherein the carrier foils (2c, 3c, 7c, 8c, 11c) are arranged with major surfaces parallel to a flow direction of the medium.

28. The flow sensor element according to claim 27, wherein the medium is gaseous and has a temperature in a range of about −40° C. to +800° C.

29. The flow sensor element according to claim 28, wherein the gaseous medium is an exhaust gas of an internal combustion engine.

30. The flow sensor element according to claim 27, wherein the medium is liquid and has a temperature in a range of about 0° C. to 150° C.

31. The flow sensor element according to claim 27, wherein the medium has periodic changes of flow direction.

* * * * *